US011420745B2

(12) United States Patent
Ducos (10) Patent No.: US 11,420,745 B2
(45) Date of Patent: Aug. 23, 2022

(54) AIRCRAFT OXYGEN MASK CONTAINER ASSEMBLY

(71) Applicant: AVOX SYSTEMS INC., Lancaster, NY (US)

(72) Inventor: Romain Ducos, Huntington Beach, CA (US)

(73) Assignee: AVOX SYSTEMS INC., Lancaster, NY (US)

(*) Notice: Subject to any disclaimer, the term of this patent is extended or adjusted under 35 U.S.C. 154(b) by 730 days.

(21) Appl. No.: 16/275,805

(22) Filed: Feb. 14, 2019

(65) Prior Publication Data

US 2019/0248494 A1    Aug. 15, 2019

Related U.S. Application Data

(60) Provisional application No. 62/630,721, filed on Feb. 14, 2018.

(51) Int. Cl.
| | | |
|---|---|---|
| *A62B 25/00* | (2006.01) | |
| *B64D 11/00* | (2006.01) | |
| *A62B 18/02* | (2006.01) | |

(52) U.S. Cl.
CPC .............. *B64D 11/00* (2013.01); *A62B 18/02* (2013.01); *A62B 25/00* (2013.01); *A62B 25/005* (2013.01); *B64D 2231/025* (2013.01)

(58) Field of Classification Search
CPC .......................... B64D 2231/025; A62B 25/005
See application file for complete search history.

(56) References Cited

U.S. PATENT DOCUMENTS

| 4,023,874 A | 5/1977 | Jong |
| 4,133,142 A | 1/1979 | Dzus, Jr. |

(Continued)

FOREIGN PATENT DOCUMENTS

| CN | 103520848 | 1/2014 |
| CN | 103661949 | 3/2014 |

(Continued)

OTHER PUBLICATIONS

Chinese Patent Application No. 201980017956.3, Office Action, dated Jun. 17, 2021, 11 pages.

(Continued)

*Primary Examiner* — LaToya M Louis
(74) *Attorney, Agent, or Firm* — Kilpatrick Townsend & Stockton LLP (57) ABSTRACT

An oxygen mask container assembly that includes a container that defines a container interior and includes a container opening, an oxygen mask assembly disposed in the container interior, a mask ejector in operative communication with the mask assembly, a cover assembly that is movable between a closed position where the cover assembly covers the container opening and an open position where the mask can be ejected through the container opening and from the container interior, and a latch assembly. The oxygen mask assembly includes a mask and a lanyard. The cover assembly includes a light assembly therein that is configured to shine light below the cover assembly. The latch assembly is configured to move the cover assembly between the closed position and the open position.

6 Claims, 5 Drawing Sheets

(56) References Cited

U.S. PATENT DOCUMENTS

| | | | | |
|---|---|---|---|---|
| 5,038,256 A * | 8/1991 | Burkarth | ............... | F21S 2/005 |
| | | | | 362/480 |
| 5,651,733 A * | 7/1997 | Schumacher | ......... | B64D 11/00 |
| | | | | 362/471 |
| 6,336,667 B1 * | 1/2002 | Ford | ................ | B64D 11/00 |
| | | | | 128/206.27 |
| 7,431,034 B2 * | 10/2008 | Westphal | ............. | B64D 13/00 |
| | | | | 128/204.18 |
| 2006/0169283 A1 | 8/2006 | Schaeffer | | |
| 2010/0294885 A1 * | 11/2010 | Bloch | ................ | A62B 25/005 |
| | | | | 244/118.5 |
| 2012/0230530 A1 | 9/2012 | Schevardo | | |
| 2014/0000595 A1 * | 1/2014 | Rittner | ................. | A62B 7/08 |
| | | | | 128/202.26 |
| 2014/0306059 A1 * | 10/2014 | Brown | ................ | B64D 11/00 |
| | | | | 244/118.5 |
| 2015/0000668 A1 * | 1/2015 | Hollm | ................. | A62B 7/14 |
| | | | | 128/204.29 |
| 2017/0137129 A1 | 5/2017 | Hessling-von Heimendahl | | |
| 2017/0368990 A1 * | 12/2017 | Blacken | ................. | B60Q 3/20 |

FOREIGN PATENT DOCUMENTS

| | | |
|---|---|---|
| CN | 103754369 | 4/2014 |
| CN | 104248802 | 12/2014 |
| CN | 104548409 | 4/2015 |
| CN | 206916786 | 1/2018 |
| GB | 1107133 | 3/1968 |

OTHER PUBLICATIONS

International Search Report and Written Opinion issued in PCT/US2019/018029.

European Application No. 19754720.1, Extended European Search Report dated Oct. 27, 2021, 8 pages.

Chinese Application No. CN201980017956.3, Office Action dated Jan. 6, 2022, 13 pages. (10 pages of Original Document and 3 pages of English Translation).

\* cited by examiner

AIRCRAFT OXYGEN MASK CONTAINER ASSEMBLY

CROSS REFERENCE TO RELATED APPLICATIONS

This application claims the benefit of U.S. Provisional Application No. 62/630,721, filed Feb. 14, 2018, the entirety of which is incorporated herein by reference.

FIELD OF THE INVENTION

The present invention relates generally to an aircraft oxygen mask container assembly, and more particularly to an aircraft oxygen mask container assembly that includes lighting therein.

BACKGROUND OF THE INVENTION

Commercial aircraft include oxygen mask systems for use in emergencies. Commercial aircraft also include cabin and passenger lighting therein. A need exists for an aircraft oxygen mask container assembly that includes lighting therein.

SUMMARY OF THE PREFERRED EMBODIMENTS

In accordance with a first aspect of the present invention there is provided an oxygen mask container assembly that includes a container that defines a container interior and includes a container opening, an oxygen mask assembly that includes a mask and a lanyard disposed in the container interior, a mask ejector in operative communication with the mask, a cover assembly that is movable between a closed position where the cover assembly covers the container opening and an open position where the mask can be ejected through the container opening and from the container interior, and a latch assembly configured to move the cover assembly between the closed position and the open position. The cover assembly includes a light assembly therein that is configured to shine light below the cover assembly.

In a preferred embodiment, the light is an LED light assembly that is movable with container assembly between the closed position and the open position. Preferably, the cover assembly includes a bezel that defines a bezel opening therein and a protective lens is positioned in the bezel opening and below the LED light assembly. In a preferred embodiment, the oxygen mask container assembly includes a panel insert that includes a flange and that is configured to be positioned in an aircraft ceiling panel. Preferably, the panel insert includes a panel insert opening therein that is co-axial with the container opening. The panel insert can be unitary or monolithically formed with the container.

In a preferred embodiment, the latch assembly is positioned on an outside of the container (it can also be positioned inside the container) and at least a portion of the cover assembly has a greater diameter than the container. The latch assembly is configured to push downwardly on the cover assembly (and preferably the bezel) to move the cover assembly from the closed position to the open position.

The present invention provides a fully integrated passenger oxygen and lighting solution in a VIP cabin interior of an aircraft. The goal is to utilize the design of the cabin and associated panels split lines to hide the oxygen system when not in use. Preferably, the oxygen system cannot be seen or is difficult to see for the passenger.

Two variants or embodiments of the invention are described herein: a pneumatic version, designed to be installed in a centralized gaseous system, and a chemical oxygen generator version intended for a decentralized chemical system. Both embodiments share the same main component and functions.

In a preferred embodiment, the combined light and oxygen container includes four main components: (1) a mask container including an electro or pneumatic latch; (2) an LED low profile spot light; (3) an oxygen source connected to the mask (various depending on system); and (4) a mask.

The aircraft oxygen mask and light assembly main functions are to provide light on a specific area during normal aircraft operation, to provide emergency oxygen to the aircraft passenger in case on an emergency. In a preferred embodiment, the mask and light combo is a panel mounted single mask receptacle that encloses a passenger oxygen mask and provides an oxygen fitting connected to the oxygen source. The container is also a mask enclosure. In a preferred embodiment, the container is made out of a main body, including a latch (pneumatic or electric depending on system), a manifold connected to the oxygen source and a mask ejector. The mask container interfaces with a panel insert and is preferably bonded in the panel. The panel insert positions and secures the mask container in place. In addition, the insert interfaces with the light. The light is preferably an LED light, that provides light to a general area (cabin lighting) or is used as a personal light source. In a preferred embodiment, the light assembly has a low profile and has a similar thickness as the panel it is mounted in/on (e.g., ½ inch). The light assembly interfaces electrically with the panel insert via an integrated connector and is retained in place by the mask container latch. In a preferred embodiment, the LED spot light acts as or is the container lid.

In use, the latch maintains the spot light in position and opens the cover assembly with which the light is associated when actuated. This allows the passenger oxygen mask to be released. Release happens in two steps: first, both the mask and LED spot light are mechanically pushed out of the way. Then, when the cover assembly and spot light are fully out of the way and held by a retaining lanyard to prevent it falling to the floor, the mask falls by gravity. Once the mask has dropped, it is held by an actuation lanyard that is within reach of the passenger. When pulled by the passenger, the actuation lanyard starts the flow of oxygen. The present invention also includes the method of ejecting the oxygen mask from the container.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-4 show an oxygen mask container assembly 10 for use in an aircraft. In a preferred embodiment, the container assembly 10 is mounted in a ceiling panel 100. The container assembly 10 generally includes a container 12, an oxygen mask assembly 14, a mask ejector 16, a cover assembly 18 and a latch assembly 20.

Figure 1:
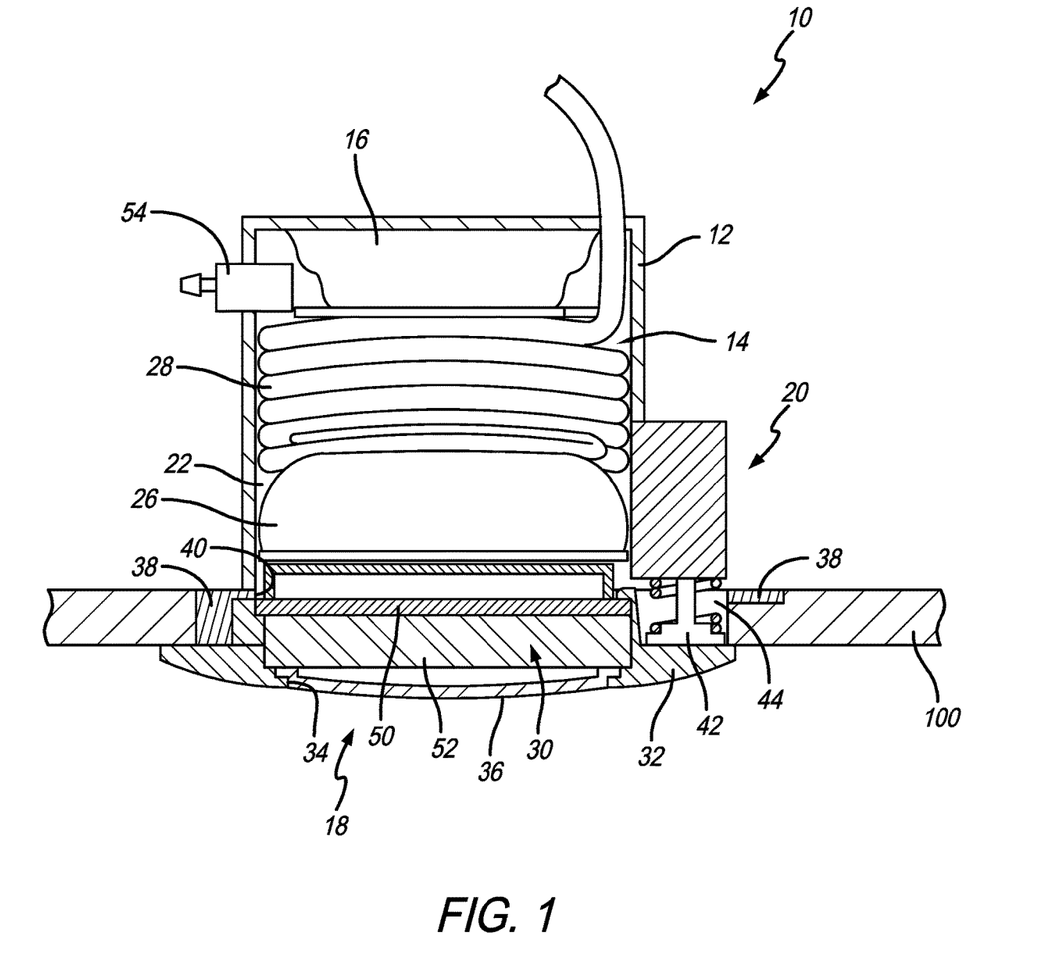
FIG. 1 is an elevational view of an aircraft oxygen mask container assembly with a portion in cross-section in accordance with a preferred embodiment of the present invention.

As shown in FIG. 1, the container 12 defines a container interior 22 and includes a container opening 24 at a bottom end thereof. The oxygen mask assembly 14 is disposed in the container interior 24. In a preferred embodiment, the mask ejector 16 is also disposed in the container interior 24. However, in another embodiment, the mask ejector 16 can be positioned outside the container 12. It will be appreciated that the mask ejector 16 is in operative communication with the mask assembly 14 such that it can eject the mask from the container interior 22 when necessary (e.g., during an emergency). In a preferred embodiment, the oxygen mask assembly 14 includes a mask 26 and a lanyard or tube 28. However, the type of oxygen mask assembly and the components thereof is not a limitation on the present invention.

Figure 2A:
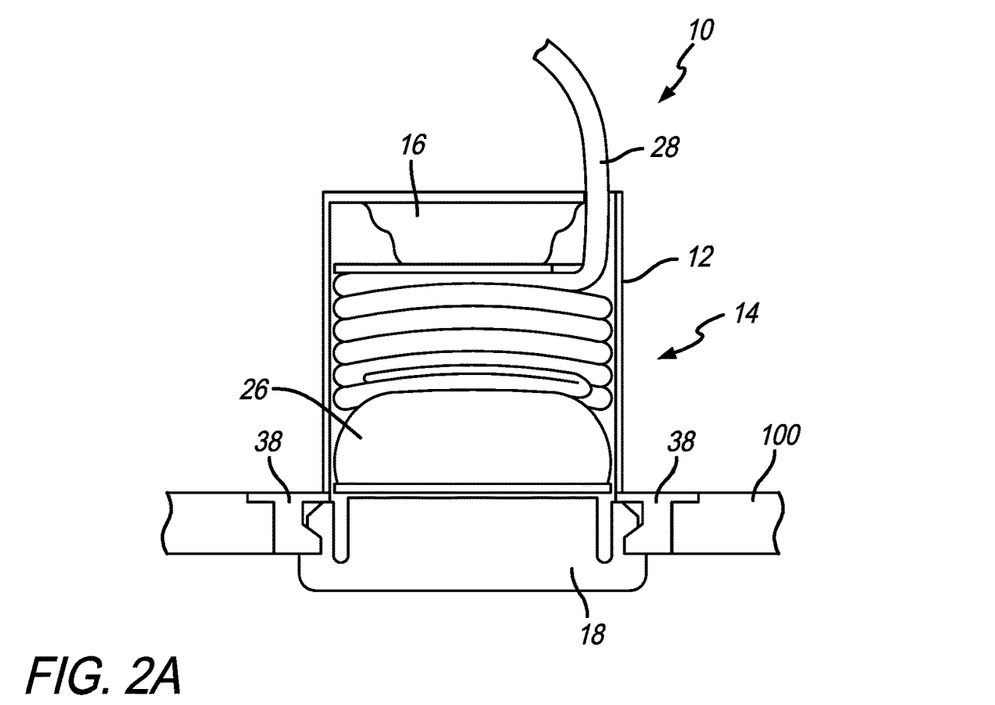
FIGS. 2A-2C are a series of views showing the cover assembly opening and the mask being ejected from the container.

In a preferred embodiment, the cover assembly 18 is movable between a closed position (FIG. 2A where the cover assembly 18 covers the container opening 24 and an open position (FIG. 2C) where the cover assembly 18 does not cover the container opening 24 and the mask 26 can be ejected through the container opening 24 and from the container interior 22. The latch assembly 20 is configured to move the cover assembly 18 between the closed position and the open position.

The cover assembly 18 includes a light assembly 30 therein that is configured to shine light below the cover assembly 18. Any type of light is within the scope of the present invention. In a preferred embodiment, the lighting is LED lighting and the components of the light assembly 30 are movable with cover assembly 18 between the closed position and the open position. Preferably, the cover assembly 18 includes a bezel 32 that defines a bezel opening 34 therein and a protective lens 36 is positioned in the bezel opening 34 and below the LED light assembly 30. It will be appreciated that the lens may just be a transparent or translucent cover and may not actually be a lens that focuses the light. In a preferred embodiment, the LED light assembly 30 includes an LED printed circuit board 50, LED lens or lenses 52 and other components necessary for the LEDs to operate. There may be a single LED or multiple, depending on the lighting needs.

In a preferred embodiment, the oxygen mask container assembly 10 also includes a panel insert 38 that is configured to be positioned in the aircraft ceiling panel 100 and that holds the container 12, cover assembly 18 and other components in the proper position. The panel insert 38 includes a panel insert opening 40 therein that is co-axial with the container opening 24 and the bezel opening 34.

Figure 2B:
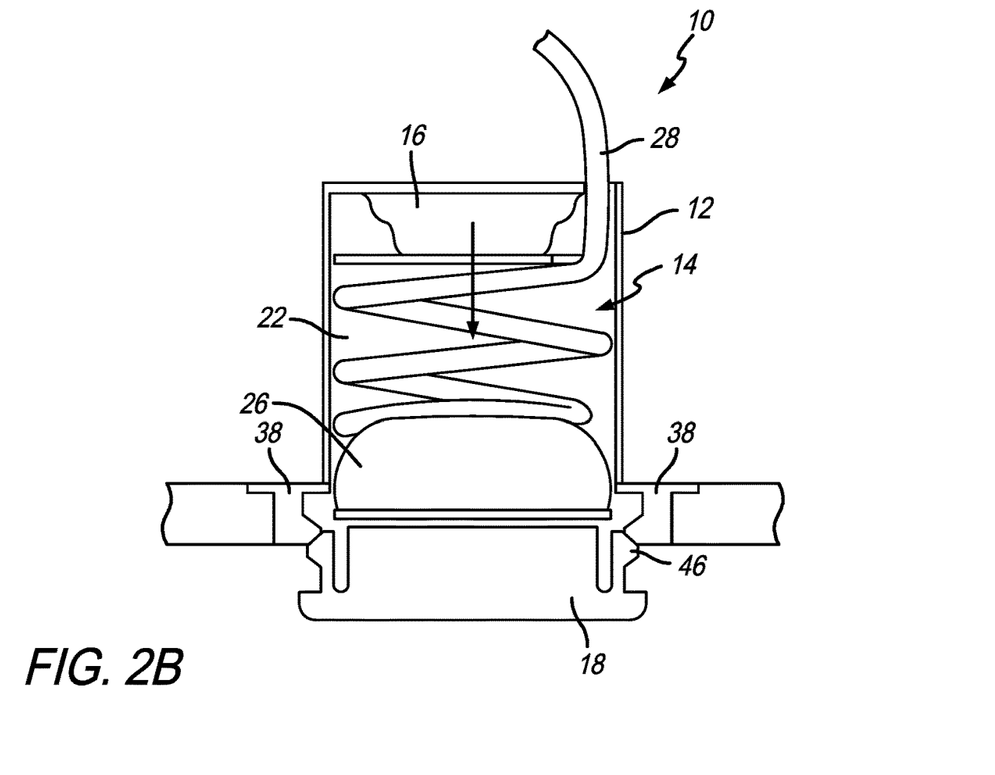
Figure 2C:
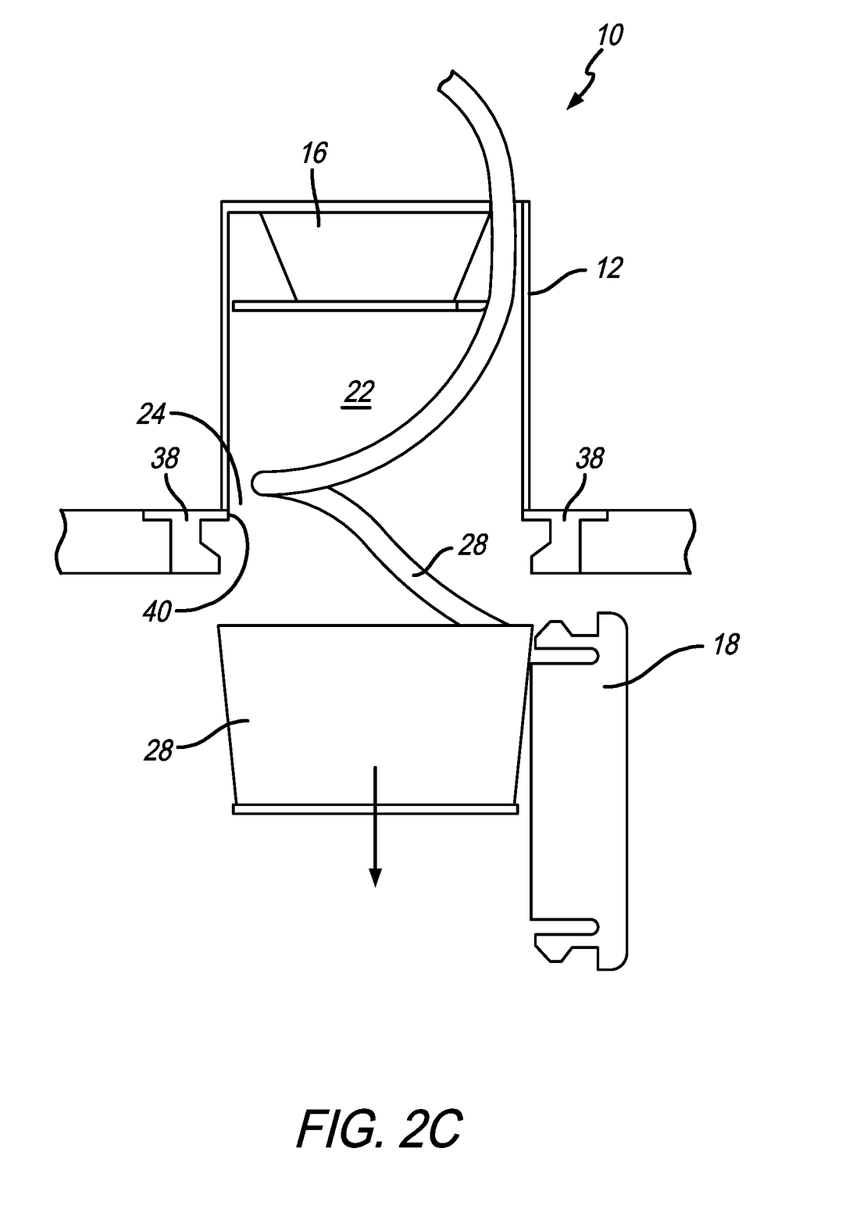
Figure 3:
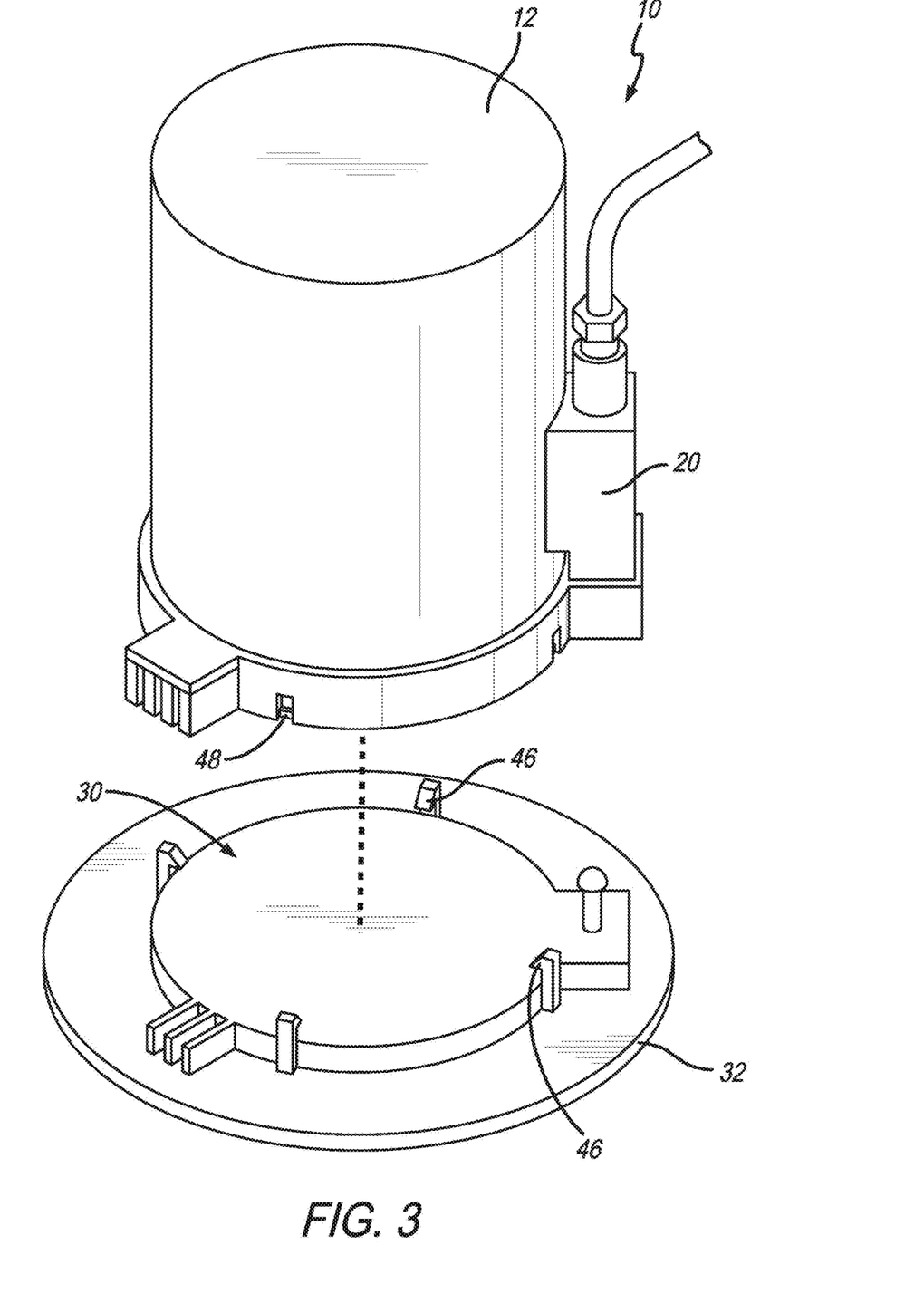
FIG. 3 is an exploded view of the aircraft oxygen mask container assembly.

The latch assembly 20 can be any latch or system that maintains the cover assembly 18 in the closed position and then opens or allows the cover assembly 18 to open at the proper time. As shown in FIG. 1, in a preferred embodiment, the latch assembly 18 is positioned on an outside of the container 12. Preferably, the bezel 32 has a greater diameter than the container 12, and the latch assembly 18 is configured to push downwardly on the bezel 32 or another portion of the cover assembly 18 to move the cover assembly 18 from the closed position to the open position. For example, the latch assembly 18 can include a spring biased plunger 42 that is seated in an opening 44 in the panel insert 38 and that is configured to push downwardly on the bezel 32 or another portion of the cover assembly 18 to release the cover assembly 18. As shown in FIG. 3, in a preferred embodiment, the bezel 32 or another portion of the cover assembly 18 includes one or more hooks 46 that mate with a ledge or strike 48 (e.g., via snap fit) and that maintain the cover assembly 18 in the proper position. Therefore, when the latch assembly 18 or plunger 42 thereof pushes downwardly, the hooks 46 come free from the strike 48 and allow the cover assembly 18 to move to the open position. As shown in FIGS. 2A-2C, in another embodiment, the cover assembly 18 can be latched or removably connected directly to the panel insert 38. It will be appreciated by those of ordinary skill in the art that the oxygen mask container assembly 10 includes the necessary connections and components for supplying power to the lights and components for ejecting the mask and also includes the necessary connections and components for supplying oxygen thereto. For example, see manifold 54 in FIG. 1 for supplying oxygen.

The oxygen mask container assembly 10 can also include a button or switch (not shown) for turning the lighting on and off. The switch can be on the assembly 10 itself or can be located remote therefrom.

Figure 4:
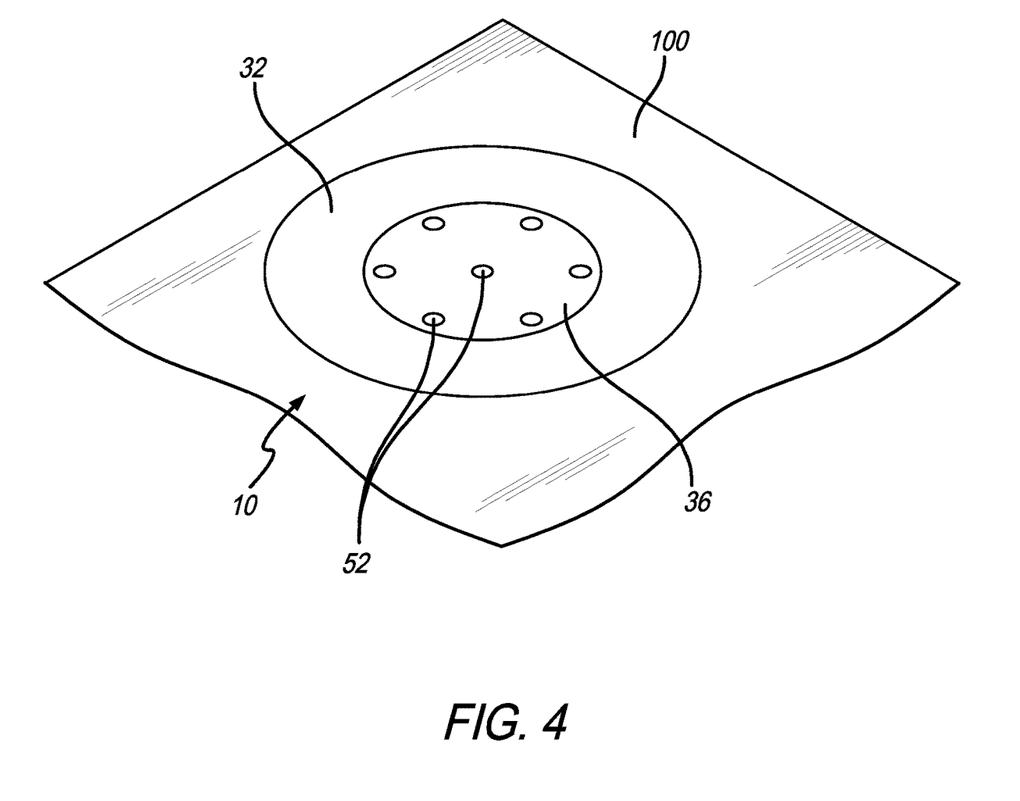
FIG. 4 is a bottom perspective view of the aircraft oxygen mask container assembly installed in a ceiling panel in an aircraft.

In normal operation, the lights are operated by passengers without it being evident that the oxygen mask is located above the light or within the container thereabove. FIG. 4 shows an exemplary view of the panel 100 with the oxygen mask container assembly 10 positioned therein. However, when an emergency occurs and the oxygen masks are needed, as shown in the sequence of FIGS. 2A-2C, the cover assembly 18 moves from the closed position (FIG. 2A) to the open position (FIG. 2C) as a result of operation of the latch assembly 18 and the mask ejector 16 ejects the mask 26 from the container interior 22 and through the container opening 24 so that it can be used by a passenger.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An oxygen mask container assembly comprising:
   a container that defines a container interior and includes a container opening,
   an oxygen mask assembly disposed in the container interior, wherein the oxygen mask assembly includes a mask and a lanyard,
   a mask ejector in operative communication with the mask,
   a cover assembly that is movable between a closed position where the cover assembly covers the container opening and an open position where the mask can be ejected through the container opening and from the container interior, wherein the cover assembly includes a light assembly therein, and wherein the light assembly is configured to shine light below the cover assembly, and
   a latch assembly configured to move the cover assembly between the closed position and the open position, wherein the latch assembly is configured to push downwardly on the cover assembly to move the cover assembly from the closed position to the open position, wherein the latch assembly is positioned on an outside of the container and wherein at least a portion of the cover assembly has a greater diameter than the container wherein the cover assembly includes a bezel that defines a bezel opening therein, and wherein a protective lens is positioned in the bezel opening and below the LED light assembly, wherein the bezel has a greater diameter than the container, and wherein the latch assembly is configured to push downwardly on the bezel to move the cover assembly from the closed position to the open position.

2. The oxygen mask container assembly of claim 1 wherein the light is an LED light assembly that is movable with cover assembly between the closed position and the open position.

3. The oxygen mask container assembly of claim 2 wherein the LED light assembly includes an LED printed circuit board and an LED lens.

4. The oxygen mask container assembly of claim 1 further comprising a panel insert that is configured to be positioned in an aircraft ceiling panel.

5. The oxygen mask container assembly of claim 4 wherein the panel insert includes a panel insert opening therein that is co-axial with the container opening.

6. An oxygen mask container assembly comprising:
a container that defines a container interior and includes a container opening,
an oxygen mask assembly disposed in the container interior, wherein the oxygen mask assembly includes a mask and a lanyard,
a mask ejector disposed in the container and in operative communication with the mask,
a cover assembly that is movable between a closed position where the cover assembly covers the container opening and an open position where the mask can be ejected through the container opening and from the container interior, wherein the cover assembly includes a light assembly therein, wherein the light is an LED light assembly that is movable with container assembly between the closed position and the open position, wherein the LED light assembly includes an LED printed circuit board and an LED lens, wherein the cover assembly includes a bezel that defines a bezel opening therein, and wherein a protective lens is positioned in the bezel opening and below the LED light assembly, and wherein the light assembly is configured to shine light below the cover assembly,
a latch assembly configured to move the cover assembly between the closed position and the open position, wherein the latch assembly is positioned on an outside of the container, wherein at least a portion of the cover assembly has a greater diameter than the container, and
wherein the latch assembly is configured to push downwardly on the bezel to move the cover assembly from the closed position to the open position,
a panel insert that is configured to be positioned in a ceiling panel, wherein the panel insert secures the container within an opening in the ceiling panel, and wherein the panel insert includes a panel insert opening therein that is co-axial with the container opening.

* * * * *